United States Patent [19]

Crooks

[11] 4,224,841

[45] Sep. 30, 1980

[54] MULTI-SPEED TEMPERATURE RESPONSIVE FAN CLUTCH

[75] Inventor: James W. Crooks, Carmel, Ind.

[73] Assignee: Wallace Murray Corporation, New York, N.Y.

[21] Appl. No.: 911,151

[22] Filed: May 31, 1978

[51] Int. Cl.² ............................ F16D 11/00; F16H 3/44
[52] U.S. Cl. .................................. 74/801; 74/750 R; 192/82 T
[58] Field of Search ................ 192/82 T, 85 AA, 57; 74/801, 802, 750 R, 752 C, 761

[56] References Cited

U.S. PATENT DOCUMENTS

| | | | |
|---|---|---|---|
| 2,981,122 | 4/1961 | Kelley | 74/752 C X |
| 3,207,279 | 9/1965 | Ahlen | 192/57 |
| 3,270,588 | 9/1966 | Bowen et al. | 74/750 R |
| 3,359,831 | 12/1967 | Scheiter | 74/761 |
| 3,763,978 | 10/1973 | Crooks | 192/54 X |
| 3,792,697 | 2/1974 | Walter et al. | 192/82 T X |
| 4,044,729 | 8/1977 | Elmer | 192/82 T X |
| 4,074,663 | 2/1978 | Cory | 192/82 T X |
| 4,081,066 | 3/1978 | Ryba | 192/82 T |
| 4,094,393 | 6/1978 | Spokas | 192/82 T |

*Primary Examiner*—Ramon S. Britts
*Attorney, Agent, or Firm*—Thomas J. Greer, Jr.

[57] ABSTRACT

A multi-speed temperature responsive fan clutch having a planetary gear unit disposed between the drive pulley and an output shaft with there being a low speed clutch and a high speed clutch, both actuated by a temperature responsive device. There is also a speed responsive clutch locking the output shaft to the pulley at low speeds.

20 Claims, 7 Drawing Figures

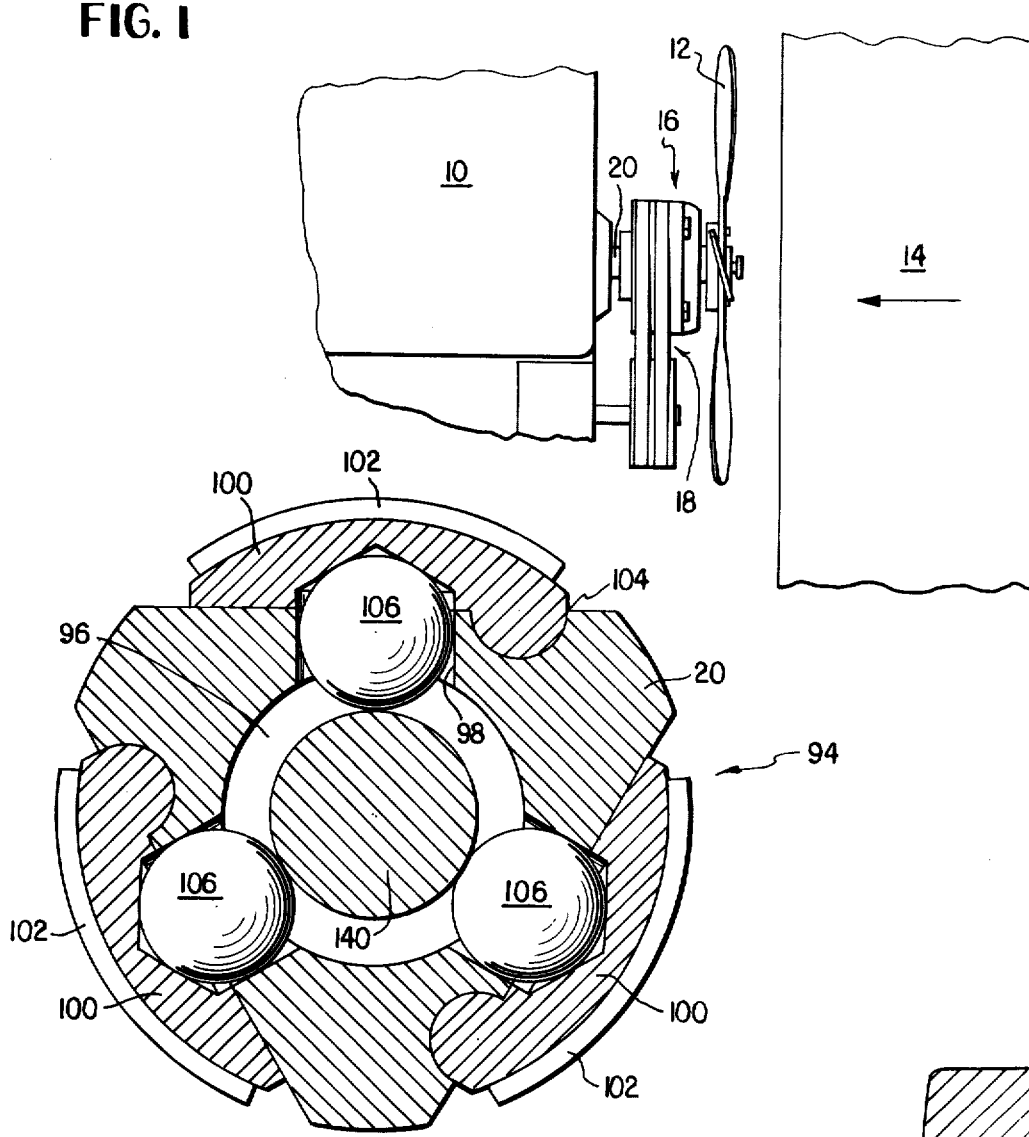
FIG. 1
FIG. 3
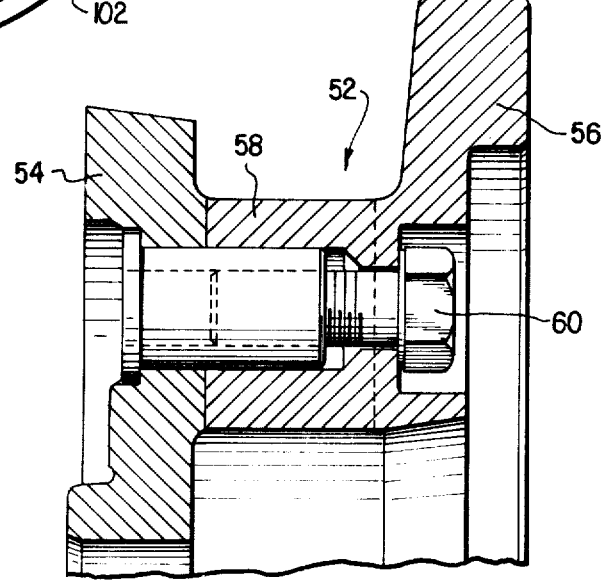
FIG. 4

MULTI-SPEED TEMPERATURE RESPONSIVE FAN CLUTCH

This invention relates to a multi-speed temperature responsive fan clutch. Such clutches are utilized to engage the fan of an internal combustion engine with the drive pulley thereof only when the temperature of air passing through an associated heat exchanger exceeds certain temperature whereby the power required to drive the fan is held to a minimum. It is well known that the horsepower lost in driving the customary cooling fan of an internal combustion engine may be a significant amount. It is also known that this lost horsepower can be saved if the fan is disconnected from its drive unit whenever the temperature of the air passing through the heat exchanger (radiator) for the internal combustion engine is lower than a preselected amount.

The problem of power loss in driving the cooling fan of an internal combustion engine has long engaged the attention of workers in the art and a great variety of clutch mechanisms for selectively disengaging a fan is know. Among the foremost of such clutches is the viscous clutch. While such a clutch is simple in construction, it has several major deficiencies. First of all, the minimum driving speed for the normal viscous clutch is much higher than that desired with low speed internal combustion engine operations. Secondly, it is relatively poor in temperature response and serves to increase the fan rpm primarily at temperatures in excess of 145° F. Even at this temperature, its reaction is relatively poor. Additionally, its efficiency at its highest loss point is only approximately 65%.

Attempts have been made by those skilled in the art to solve the efficiency problem of driving internal combustion engine cooling fans other than by means of a viscous clutch. These have included plural clutch arrangements which are operative to provide for high and low speed cooling. Also in the past, suitable transmission assemblies, including planetary gear units, have been utilized for the driving of the fan. While not intended to be exhaustive, the attention of the reader is invited to the following U.S. patents as illustrative of such prior constructions: U.S. Pat. No. 2,981,122, issued to Kelley; U.S. Pat. No. 3,207,279, issued to Ahlen; U.S. Pat. No. 3,270,588, issued to Bowen; U.S. Pat. No. 3,359,831, issued to Scheiter; U.S. Pat. No. 3,763,978, issued to Crooks; and U.S. Pat. No. 3,792,697, issued to Walter.

According to this invention, a planetary gear unit is interconnected between the drive pulley and the output shaft of the fan drive unit and there is a low speed clutch unit for retarding the rotation of the sun gear so that the planetary gear carrier to which the output shaft is coupled is driven at a speed slower than the rotational speed of the drive unit. A second clutch is provided for locking the planet carrier to the sun gear to provide a high speed driving of the output shaft at speeds up to the speed of the drive unit. The two clutch units are actuated in sequence by a thermal responsive device.

In one embodiment of the invention, a single linear expansible temperature responsive device first engages the low speed clutch unit to lock the sun gear against rotation, and then further expansion thereof engages the high speed clutch unit. In this embodiment, the sun gear is permitted to override the locking thereof by the low speed clutch unit through the provision of an overrunning clutch unit.

In a second embodiment of the invention, the temperature responsive device may control air pressure type actuators which are operable to release the low speed clutch unit when the high speed clutch unit is engaged, thereby eliminating the need for the overrunning clutch unit.

In order that the output shaft may be connected to the drive unit at low speeds, there may be provided a further clutch unit which normally locks the planet carrier to the ring gear and there being associated with the drive unit a speed responsive device for releasing this further clutch unit at a preset rotational speed.

In the drawings:

FIG. 1 is a schematic elevational view showing the fan clutch of this invention mounted with respect to an internal combustion engine and its associated heat exchanger.

FIG. 3 is a fragmentary transverse sectional view showing the details of the low speed clutch unit.

FIG. 4 is a fragmentary longitudinal sectional view through the planet area in a plane angularly rotated from the plane of FIG. 2, i.e., a sectional view taken at a different angular or circumferential plane.

Figure 2:
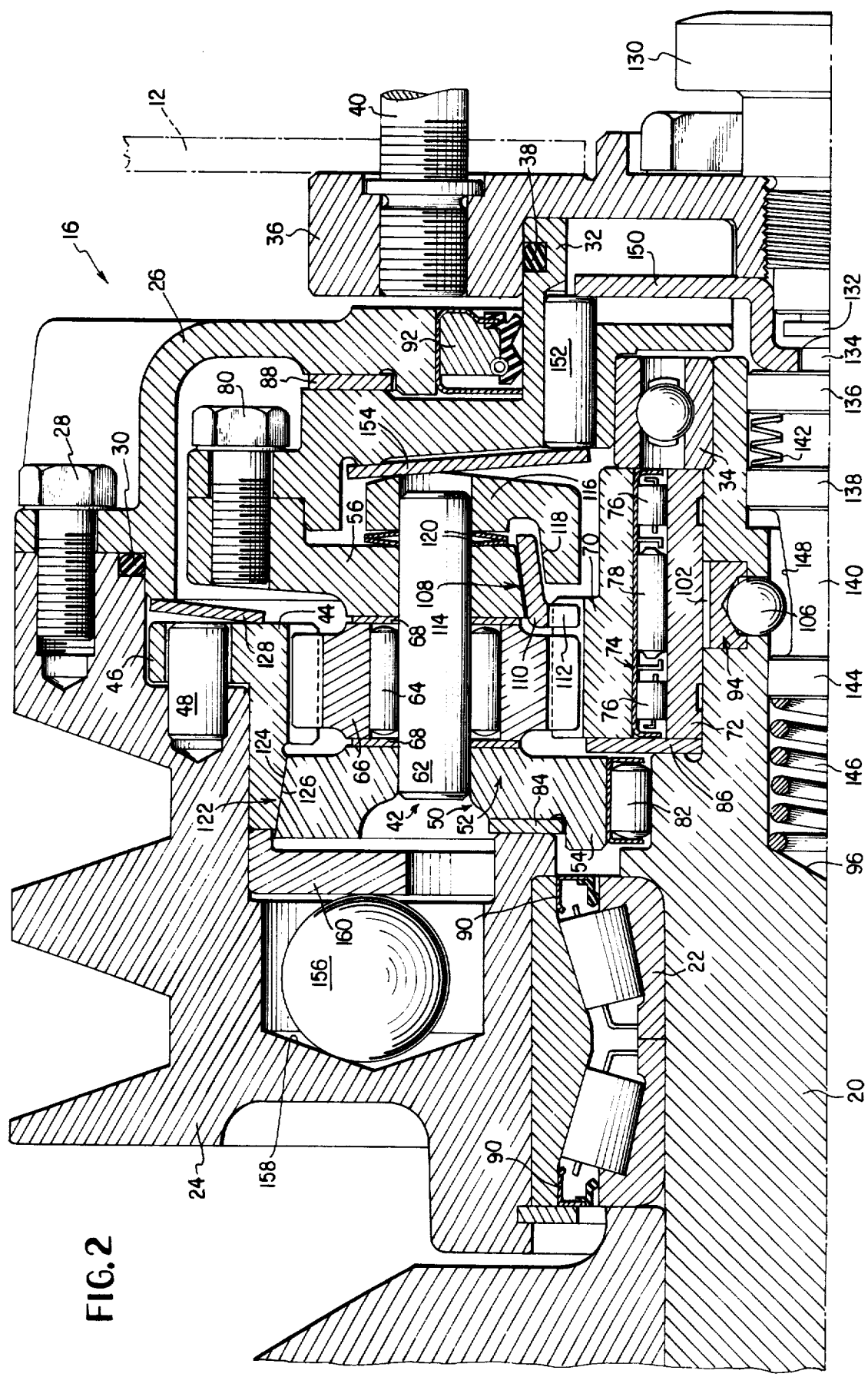
FIG. 2 is a longitudinal half sectional view illustrating a first embodiment of the invention.

Referring now to FIG. 1, there is illustrated an internal combustion engine 10 having a cooling fan 12 with which there is associated a radiator 14 or other type of air cooled heat exchanger. The fan 12 is driven to draw air through the radiator 14 (in the direction of the arrow) and in accordance with this invention, the fan 12 is driven through a multi-speed temperature responsive drive device, generally identified by the numeral 16. The drive device 16 is driven from the internal combustion engine 10 by means of a drive pulley and belt arrangement 18.

Referring now to FIG. 2, it will be seen that the drive device 16 includes a dead shaft 20 which is fixedly mounted on the front of the internal combustion engine 10. The dead shaft 20 carries adjacent the left end thereof a bearing assembly 22 which mounts thereon in axially fixed relation a drive unit 24 in the form of a pulley which is driven by the pulley and belt arrangement 18. The pulley 24 has fixed to the front end thereof for rotation therewith a casing 26. The casing 26 is secured to the pulley 24 by bolts 28 and sealed relative thereto by means of an O-ring seal 30.

An output shaft 32 is rotatably journalled on the right portion of the dead shaft 20 by means of a bearing unit 34. A fan mounting hub 36 is pressed onto the right hand portion of the output shaft 32 and is sealed relative thereto by means of an O-ring seal 38. The fan 12 is removably secured to the hub 36 by means of suitable fasteners 40.

A planetary gear unit, generally identified by the numeral 42, is mounted within the pulley 24 and the casing 26 and functions to selectively connect the pulley 24 to the output shaft 32. The gear unit 42 includes a ring gear 44 carried by the pulley 24 for rotation therewith. The ring gear 44 includes a mounting flange 46 which is mounted on pins 48 carried by the pulley 24 for axial movement.

The gear unit 42 also includes a planetary unit, generally identified by the numeral 50. The planetary unit includes a two-piece carrier, generally identified by the numeral 52. As best shown in FIG. 4, the carrier 52 includes a left part 54 and a right part 56 with the right part 56 including a hub portion 58. Parts 54, 56 are removably interconnected by means of circumferentially spaced fasteners 60.

Carried by the carrier 52 at circumferentially spaced intervals are shafts 62. Mounted on each shaft 62 by means of bearing 64 is a planetary gear 66. Suitable thrust washers 68 are disposed on opposite sides of the gear 66. The gears 66 mesh with the ring gear 44.

The gear unit 42 also includes a sun gear 70 which is meshed with the planetary gears 66. The sun gear 70 is mounted for rotation on an inner race member 72 by a bearing assembly, generally identified by the numeral 74. The bearing assembly 74 includes axially spaced bearings 76 and an intermediate overrunning clutch 78. The inner race 72 is, in turn, rotatably journalled on the dead shaft 20.

It is to be noted that the carrier 50 is fixedly secured to the output shaft 32 for rotation therewith by means of fasteners 80. The left hand carrier member 54 is also journalled on the dead shaft 20 by means of a bearing 82.

At this time it is pointed out that the gear unit 42 is positioned with respect to other components of the drive 16 by means of a thrust washer 84 between the pulley 24 and the left hand carrier member 54, a thrust washer 86 between the sun gear 70 and the dead shaft 20, and a thrust washer 88 between the casing 26 and the output shaft 32. It is also to be noted that the bearing 22 incorporates therein suitable seals 90 and that the gear unit 42 is further sealed by means of a seal 92 between the casing 26 and the output shaft 32.

It is to be understood that when the sun gear 70 is free to rotate and the planetary carrier 52 is not locked relative to the sun gear or the ring gear, the output shaft 32 is free to rotate independently of the pulley 24. However, when the sun gear 70 is locked against rotation, the carrier 52 will rotate at approximately ⅝ pulley speed. When the carrier 52 is locked to either the sun gear or the ring gear 44, the fan will rotate at full drive pulley speed.

In order to lock the sun gear 70 against rotation, there is provided a first clutch unit, generally identified by the numeral 94. The clutch unit 94 is best shown in FIG. 3 and is located at a point on the dead shaft 20 where the dead shaft is generally triangular in cross section. The dead shaft 20 has a central bore 96 and radial bores 98. The outer ends of the radial bores 98 are closed by clutch members 100 carrying shoes 102. Each clutch member 100 has a hinge connection 104 with the dead shaft 20. Positioned within each bore 98 is a ball 106 which, when moved outwardly, engages its respective clutch member 100 and forces the same outwardly. As shown in FIG. 2, the shoes 102 are engagable with the inner surface of the race 72 for locking the same against rotation. When the race 72 is locked against rotation, the overrunning clutch 78 locks the sun gear 70 against normal directional rotation.

A second clutch unit, generally identified by the numeral 108, is disposed between the right hand carrier member 56 and the sun gear 70. To this end, there is provided an intermediate cone 110 having teeth 112 interlocked with the teeth of the sun gear 70. The inner surface of the carrier part 56 is conical as at 114 to match the outer surface of the cone 110.

The clutch unit 108 also includes an actuating piston 116 which is mounted on the shafts 62 for axial movement. The piston member 116 has an outwardly facing conical surface 118 which matches the inner surface of the cone 110. The piston member 116 is normally urged to a clutch releasing position by a pair of opposed Bellville springs 120.

There is a third clutch unit, generally identified by the numeral 122, between the left carried member 54 and the ring gear 44. It is to be noted that the carrier part 54 has a conical outer surface 124 which mates with a conical inner surface 126 on an extension of the ring gear 44. The ring gear 44 is constantly urged to the left by a Bellville spring or washer 128 disposed between the flange 46 and the casing 26 so as to engage the clutch unit 122.

Removably mounted within the hub 36 in alignment with the bore 96 and the dead shaft 20 is a conventional heat responsive device 130 such as a Vernatherm brand heat responsive device. The heat responsive device includes a disk 132 which moves to the left in response to temperature increases.

The disk 132 engages a button 134 of a disk 136 guided in the bore 96. The disk 136 is separated from a right end 138 of a spool 140 by a plurality of Bellville springs 142 and a left hand end 144 of the spool 140 engages a coil spring 146. The spool 140 has a conical outer surface 148 engaging with the balls 106 in response to movement of the spool 140 to the left so as to actuate the clutch unit 94 and gradually slow down and lock the race 72 against rotation, thereby locking the sun gear 70 against rotation in the predetermined direction.

Generally carried by the left part of the heat responsive device 130 is a bracket 150 which has an outer bracket thereof engaged with a plurality of pins 152 which are mounted within the output shaft 32 for axial movement. A relatively wide Bellville spring or washer 154 is disposed between the output shaft 32 and the piston member 116 with the pins 152 engaging the inner portion of the Bellville spring 154. It will be seen that the Bellville spring 154 bears against both the output shaft 32 and the piston member 116 and functions as a lever with a 3:1 advantage.

Operation

The drive 16 has four functions, each automatically actuated. At idle engine speeds (600–850 rpm) the clutch unit 2 is engaged and the output shaft 32 rotates at the same speed as the pulley 24. When the rotational speed of the pulley 24 increases to speeds over 850 rpm, balls 156 which are carried by and within the pulley 24 and engaging sloping surfaces 158, move radially out due to centrifugal force and to the right, forcing a pressure plate 160 to the right which, in turn, moves the ring gear 44 to the right against the resistance of the Bellville spring 128 to disengage the clutch unit 122. The fan 12 is now free wheeling.

At drive pulley speeds over 850 rpm, no clutch units in the fan drive are engaged. Assuming a fan "windmill" speed due to ram air of 700 rpm and drive pulley speed of 2100 rpm, the sun gear, which is locked by the overrunning clutch, and the race member 72 are turning free on the dead shaft in opposite rotation to drive pulley rotation at a speed of 2100 rpm.

When air temperatures coming out of the radiator 14 exceed 131° F. the disk or piston 132 of the temperature responsive device 130 moves to the left sufficiently to move the spool 140 to the left so as to begin engagement of the clutch unit 94. When this occurs, the race 72 tends to stop from turning and this causes the sun gear to tend to stop turning because of the overrunning clutch 78. As the sun gear slows to a stop (as temperature increases), the planetary carrier 52 speeds up until (assuming a drive pulley speed of 2100 rpm) the carrier speed reaches 1400 rpm at a radiator outlet air temperature of 147° F. At this time the fan is fully engaged in low gear with 0% drive slip.

When the radiator outlet air temperatures exceeds 147° F., the temperature responsive device 130 has been actuated sufficiently for the disk or piston 132 thereof to engage the bracket 140 which moves the pins 152 to the left causing the Bellville spring 154 to move the piston member 116 to the left and begin engagement of the clutch unit 108. This causes the planetary carrier 52 and the sun gear to be engaged together thereby tending to speed up the sun gear, which is possible due to overrunning of the overrunning clutch 78. The planetary carrier gradually increases in speed until at 160° F. there is no slip in the clutch unit 108 and the fan 12 is running at full drive pulley speed. p It is to be understood that when radiator outlet air temperature decreases, because of the various springs, the drive operation gradually reverses itself until full disk-connection is achieved when the temperature decreases sufficiently far.

Figure 5:
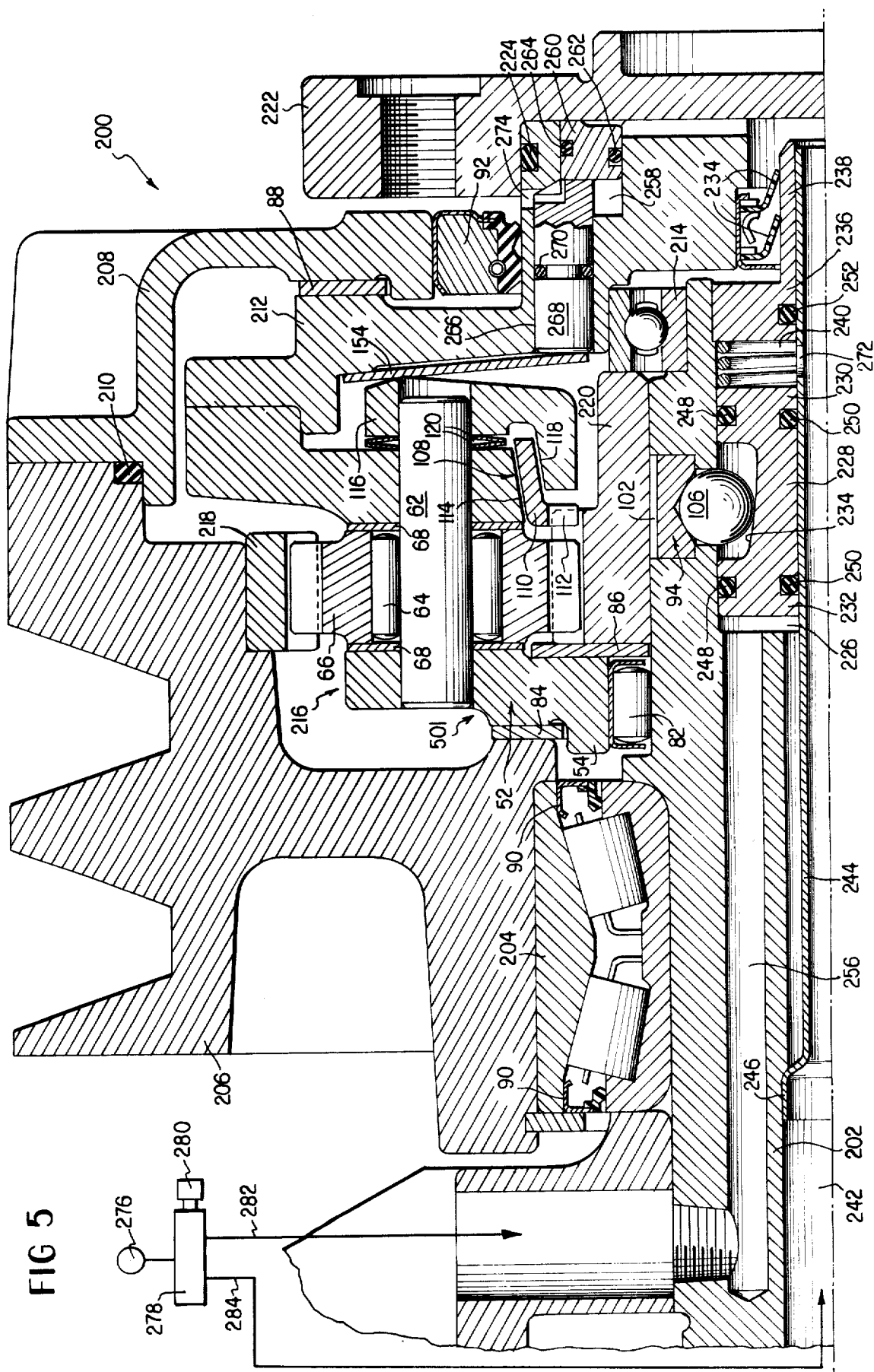
FIG. 5 is a view similar to FIG. 2 and illustrates a second embodiment of the invention.

A modified drive is illustrated in FIG. 5 and is generally identified by the numeral 200. The drive 200 includes a dead shaft 202 which carries a bearing unit 204 which mounts a drive pulley 206 on the dead shaft 202 for rotation and fixes the same against axial movement. A casing 208 is removably secured to the drive pulley or drive unit 206 and is sealed relative thereto by means of an O-ring seal 210.

The drive 200 includes an output shaft 212 which is rotatably journalled on the right end of the dead shaft 202 by means of a bearing unit 214.

A planetary gear unit 216 is mounted within the pulley 206 and the casing 208 between the pulley 206 and the output shaft 212. The planetary gear unit 216 includes a ring gear 218 which is fixedly secured to the pulley 206 for rotation therewith. It also includes a sun gear 220 rotatably journalled on the dead shaft 202.

The gear unit 216 further includes a planetary gear unit 501 which is identical with the previously described gear unit 50 of FIG. 2 except that the clutch surface 126 of FIG. 2 is omitted from the carrier left part 54. The output shaft 212 is removably secured to the carrier 52 in the same manner as the output shaft 32 and the carrier 52 is journalled on the dead shaft 202 by the bearing 82.

It is to be understood that the drive 200 has seals and thrust washers corresponding to those of the drive 16 and these elements will not be described in detail here. It is also to be understood that the output shaft 212 will be provided with a mounting hub 222 which carries the fan 12 and which is pressed onto the output shaft 212 and sealed relative thereto by means of an O-ring seal 224.

The reader will observe that the dead shaft 202 carries the clutch unit 94 and that the gear unit 216 has incorporated therein the clutch unit 108. The clutch unit 122 has been omitted in the illustrated drive 200, but if it is so desired, the ring gear 218 could be of the same construction as the ring gear 44 of FIG. 2 and mounted in the same manner for cooperation with the carrier 52 through the clutch unit 122. However, for simplicity of illustration, the clutch unit 122 has been omitted.

It is to be understood that the control mechanism of the drive 200 is different from that of the drive 16. First of all, the dead shaft 202 has a bore 226 in which there is mounted a spool 228 which includes a right portion 230 and a left portion 232 on opposite sides of an intermediate ramp portion 234.

The right end of the bore 226 is closed by a plug 236 which includes a sleeve portion 238. A spring 240 disposed between the plug 236 and the spool 228, constantly urges the spool to the left to a clutch releasing position.

At this time it is pointed out that the dead shaft 202 has a central bore 242 and extending a major portion of the bore 242 is a tube 244 which is generally sealed to the bore 242 as at 246. The spool 228 is sealed relative to the bore 226 by seals 248 and to the tube 244 by seals 250. The plu4 236 is sealed relative to the tube 244 by a seal 252 and the output shaft 212 is sealed relative to the plug 236 by seals 234.

The dead shaft 202 has a passageway 256 which opens into the left end of the bore 226. The tube 244 defines a second passageway which extends entirely through the dead shaft 202 and opens into the space between the output shaft 212 and the hub 222.

The right end of the output shaft 212 has formed therein an annular recess 258 which defines an annular cylinder for an annular piston 260 having suitable inner and outer seals 262, 264. Generally aligned with the recess 258 are circumferentially spaced bores 266 which carry axially movable pins 268 which are sealed relative to bores 266 by seals 270.

It will be noted that the tube 244 has an opening 272 which opens into the bore 226 between the spool 228 and the plug 236. Further, the recess 258 to the left of the piston 260 is vented to the atmosphere through a vent opening 274 through the output shaft 212.

Operation

In order to automatically control the operation of the drive 200, there is provided a pressurized air source 276 which is connected to a conventional valve 278, such as a spool valve. The spool valve 278 has coupled thereto for shifting the spool thereof a conventional temperature responsive device 280 which may be in the form of a Vernatherm brand temperature response device. The valve 278 is coupled to the passage 256 by a line 282 and to the bore 242 defined by the tube 244 by a line 284.

It is to be understood that the valve 278 has three positions. In the low temperature condition, the valve 278 is closed against air flow. In a first temperature range, the valve 278 opens to provide air pressure to the line 282. In a high temperature position, the valve 278 exhausts pressure in line 282 and opens to the line 284 to deliver air pressure thereto.

At this time it is pointed out that the temperature responsive device 280 may be actuated by air flowing through the radiator 14, but it is preferred that it be of a type which is actuated by the temperature of the cooling liquid of the internal combustion engine.

At a cooling temperature below which the fan 12 is not required, no clutches are engaged. Assuming a fan "windmill" due to ram air of 700 rpm and drive pulley speed of 2100 rpm, the sun gear turns free on the dead shaft in an opposite direction of rotation to the drive pulley at a speed of 2100 rpm.

When coolant temperature reaches a preselected level and mild fan cooling is desired, the valve 278 is actuated to allow pressurized air through line 282 into the passage 256 to react against the left end of the spool 228 and shift the spool to the right, gradually engaging the clutch unit 94. The shoes 102 engage the inner surface of the rotating sun gear 220 and as the sun gear slows to a stop, the planetary carrier 52 speeds up until (assuming a drive pulley speed of 2100 rpm) the carrier reaches 1400 rpm. At this point the fan is fully engaged in low gear with 0% drive slip in the clutch unit 94.

When coolant temperature reaches a higher predetermined level and full fan cooling is desired, the valve 278 or if preferred a second valve (not shown) is actuated so as to supply air under pressure to the line 284 and into the passageway defined by the tube 244. This high pressure air passes entirely through the tube 244 into the space to the right of the piston 260 and urges the piston 260 to the left so as to engage the clutch unit 108. At the same time, pressurized air passes out through the orifice 272 into the bore 226 to the right of the spool 228 urging the spool 228 so as to disengage the clutch unit 94. This combined action causes the planetary carrier and sun gear to be engaged together thereby tending to speed up the sun gear in a positive direction and thus increasing the carrier and fan speed until full direct drive is achieved with 0% slip in the clutch unit 108.

It is to be understood that when coolant temperature decreases, the means of drive operation is sequentially reversed until the drive becomes fully disengaged if coolant temperature reaches a sufficiently low level.

Figure 6:
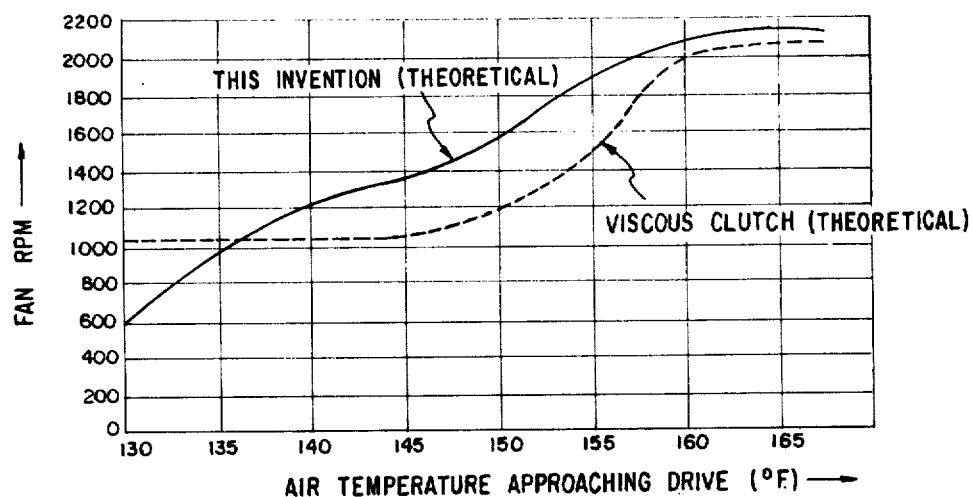
FIG. 6 is a graph comparing fan rpm of the invention with that of a (theoretical) viscous clutch with changing air temperatures.

Reference is now made to FIG. 6 wherein it is shown that the drives of this invention provide for a more uniform increase in fan speed with temperature increases. It is believed that the graph is obvious and specific description thereof is not required. The graphs were made from calculated data and do not represent actual tests.

Figure 7:
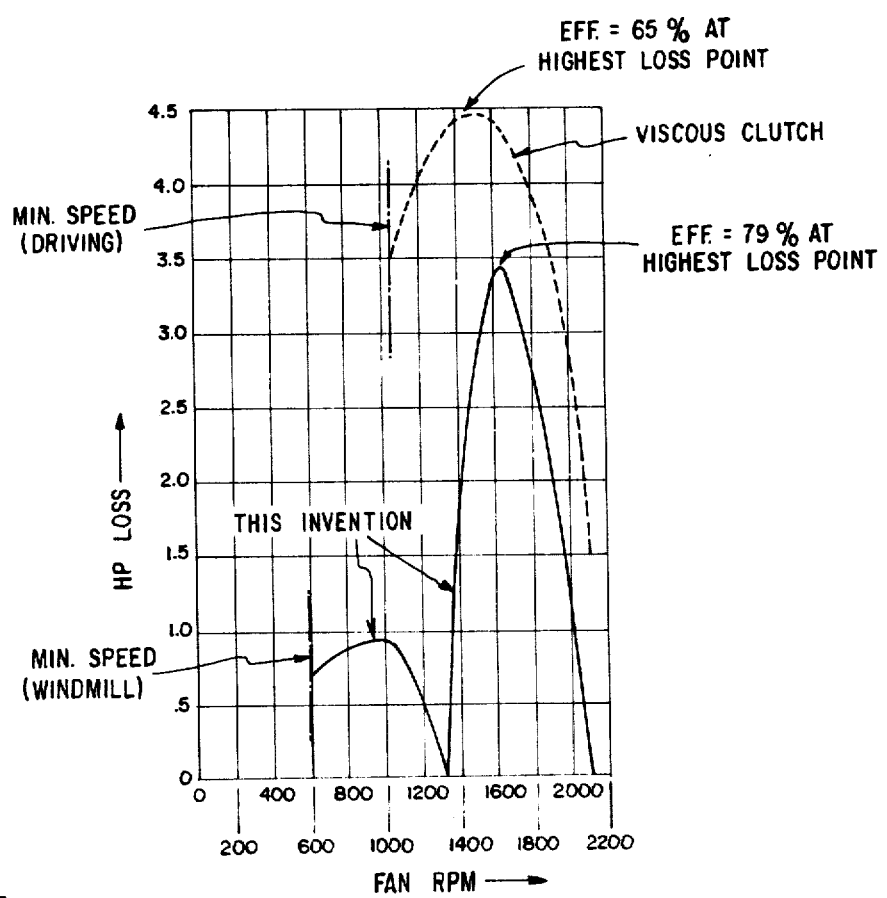
FIG. 7 is a graph comparing horsepower loss of the invention with that of a ciscous clutch at different fan rpm.

In a like manner, reference is made to FIG. 7 wherein the horsepower loss is plotted against fan rpm and shows the great savings in horsepower realized with the drives of this invention as compared to a viscous clutch drive. It is to be noted that there are appreciable savings and in addition it is possible to have low speed fan drives where not possible with the viscous clutch arrangement. Again, the graphs were made from calculated data.

What is claimed is:

1. A multi-speed temperature responsive fan drive including a dead shaft, a rotating drive unit mounted on said dead shaft for rotation, an output shaft mounted on said dead shaft for selective rotation with and relative to said drive unit, a planetary gear unit for selectively coupling said output shaft to said drive unit; said planetary gear unit including a ring gear coupled to said drive unit for rotation therewith, a sun gear rotatably journalled on said dead shaft, and a planetary unit including a carrier fixedly secured to said output shaft; and temperature responsive control means for selectively locking components of said planetary gear unit to selectively vary said rotational speed of said output shaft relative to said drive unit.

2. The drive of claim 1 wherein said control means includes a clutch unit between said carrier and said sun gear for controlling the selective rotational speed between said carrier and said sun gear.

3. The drive of claim 2 wherein said control means includes an actuator for said clutch unit carried by said output shaft.

4. The drive of claim 1 wherein said clutch unit includes an intermediate clutch member carried by said sun gear.

5. The drive of claim 1 wherein said clutch unit includes an intermediate clutch member carried by said sun gear in interlocked axial sliding relation.

6. The drive of claim 1 wherein said clutch unit includes an intermediate clutch member carried by said sun gear in interlocked axial sliding relation and a clamping piston carried by said carrier for axial relative movement.

7. The drive of claim 6 wherein there is a lever type actuator positioned between said clamping piston and said output shaft.

8. The drive of claim 2 wherein said control means includes a second clutch unit for controlling the rotation of said sun gear.

9. The drive of claim 8 wherein there is a single temperature responsive device for sequentially actuating said clutch units.

10. The drive of claim 8 wherein there is a single temperature responsive device for sequentially actuating said clutch units to first engage said second clutch unit and then the first mentioned clutch unit.

11. The drive of claim 9 wherein said temperature responsive device is of the linear expansion type.

12. The drive of claim 9 wherein said temperature responsive device includes an air pressure selector valve.

13. The drive of claim 8 wherein there is a single temperature responsive device for sequentially actuating said clutch units to first engage said second clutch unit and then the first mentioned clutch unit while releasing said second clutch unit.

14. The drive of claim 8 wherein there is a third clutch unit for locking said output shaft relative to said drive unit.

15. The drive of claim 14 wherein said third clutch unit is normally engaged and there is a speed responsive means for releasing said third clutch unit above a preset rotational speed of said drive unit.

16. The drive of claim 1 wherein there is a clutch unit for locking said output shaft relative to said drive unit.

17. The drive of claim 16 wherein said clutch unit is normally engaged and there is a speed responsive means for releasing said clutch unit above a preset rotational speed of said drive unit.

18. The drive of claim 1 wherein said control means includes a low speed clutch unit for controlling the rotation of said sun gear.

19. The drive of claim 18 wherein said clutch unit is of the radial braking type including clamping shoes.

20. The drive of claim 19 wherein there is an overrunning clutch between said clutch unit and said sun gear.

* * * * *